May 24, 1955 — MINORU NAKAI — 2,708,812
PLANTING AID
Filed Dec. 28, 1951

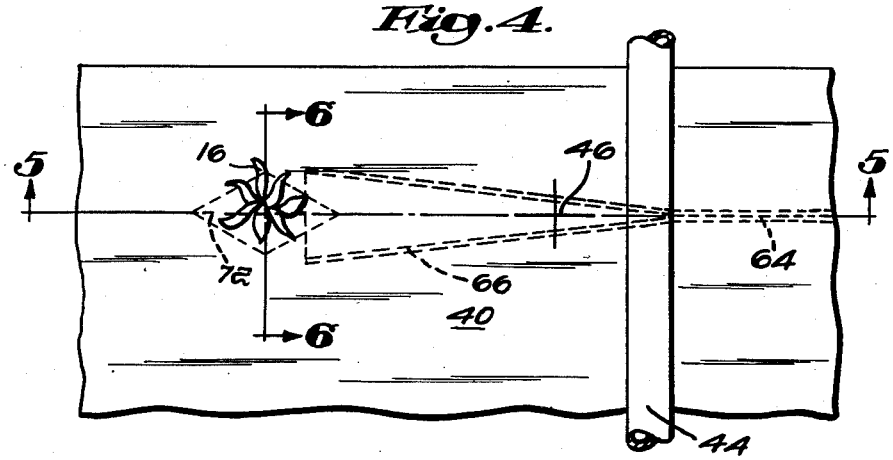
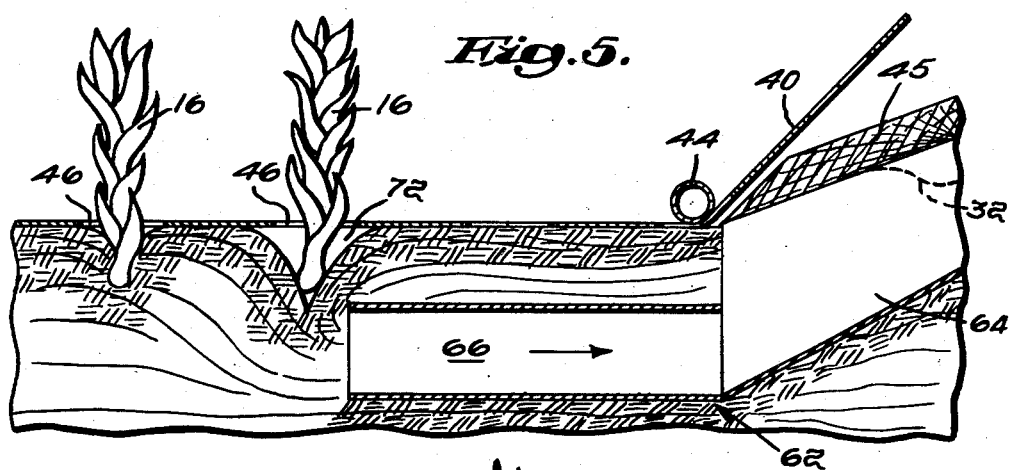
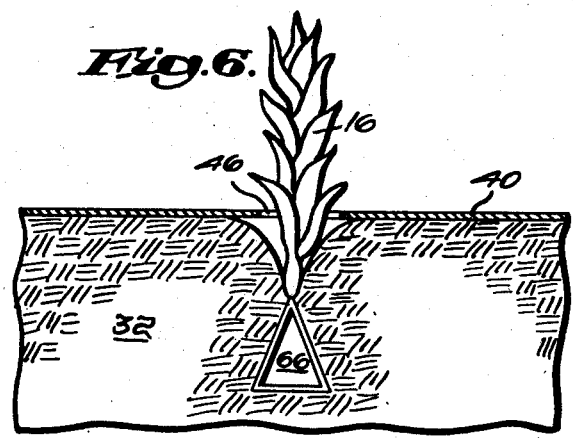

United States Patent Office 2,708,812
Patented May 24, 1955

2,708,812

PLANTING AID

Minoru Nakai, Kaunakakai, Territory of Hawaii, assignor to Hawaiian Pineapple Company, Limited, Honolulu, Territory of Hawaii, a corporation of Hawaii Application December 28, 1951, Serial No. 263,745

3 Claims. (Cl. 47—9)

My invention concerns a planting aid adapted for use in planting operations wherein it is necessary or desirable to cover the soil with paper or a functionally equivalent material serving to retard evaporation of moisture from the soil. The invention having been developed with special reference to the planting of pineapple slips or crowns, it will be specifically described in that connection.

The invention effectively integrates two procedures heretofore separately carried out in planting operations, namely the laying of the mulch paper and the actual setting of the plants. By means thereof the overall operation is greatly speeded up with a vast reduction in labor requirements. Thus, whereas it was formerly necessary in the pineapple industry to employ large crews of men to plant the pineapple slips through the mulch paper (previously laid out on the prepared soil), it is now possible to accomplish the planting of the slips essentially as an incident of the laying out of the paper and with only a few more men than were required for the latter operation as separately performed.

Generally described, a planting aid conforming to my invention includes a body portion adapted to be moved over the soil, normally by towing, as with a tractor. The body portion, which may have the form of a sled, for example, has associated therewith means for paying out a strip of mulch paper or the like and means for perforating the paper in selected areas as determined by the desired spacing of the plants. A plow member depends from the body portion in position to create fugitive voids in the soil under the perforations as the body portion is moved over the soil in the laying of the paper. In operation, the plants are inserted through the perforations into the fugitive voids, the filling of which on the continued movement of the body portion serves to anchor the plants at the proper depth for optimum growth.

Referring now to the accompanying drawings illustrating the invention in its embodiment preferred in the case of the planting of pineapple slips:

Figs. 4, 5 and 6 are operational details.

Figure 1:
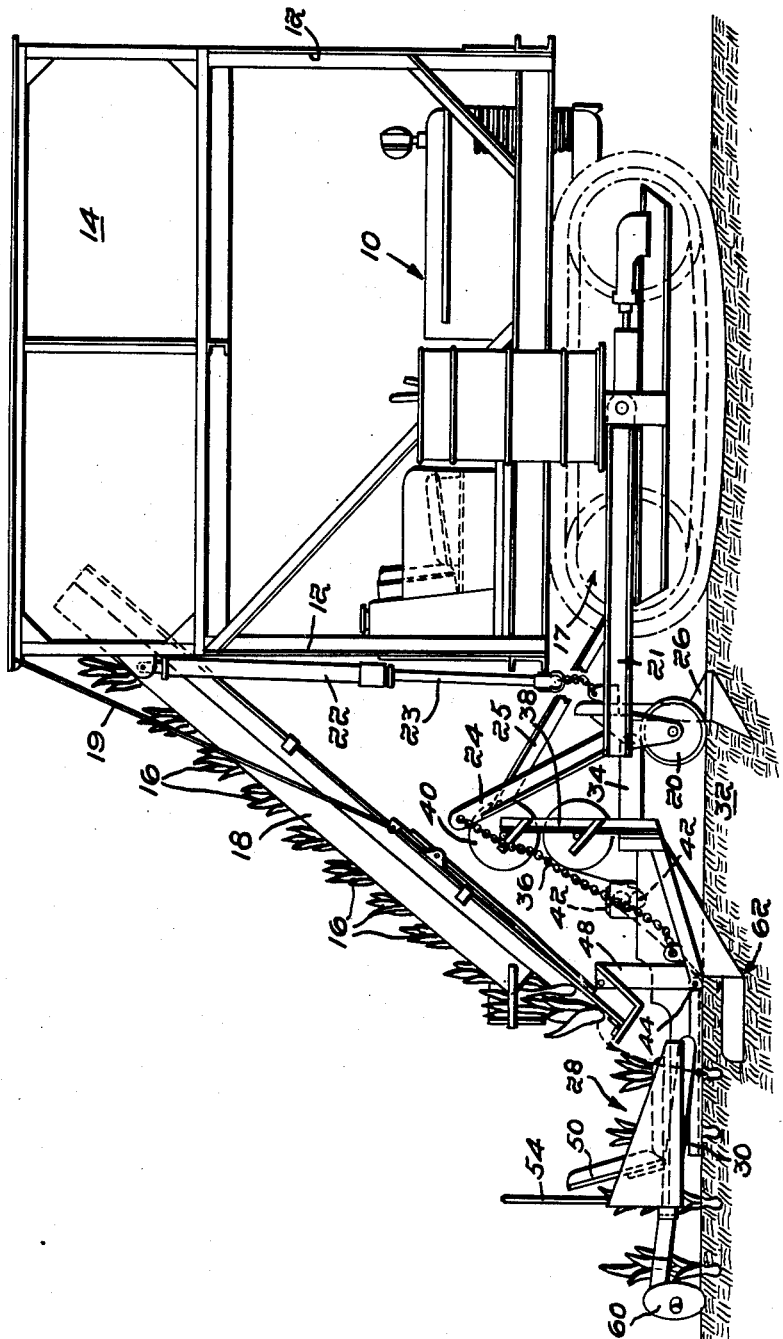
Fig. 1 is a side elevation showing the planting aid in association with a tractor, by means of which the planting aid is towed over the soil.
Figure 2:
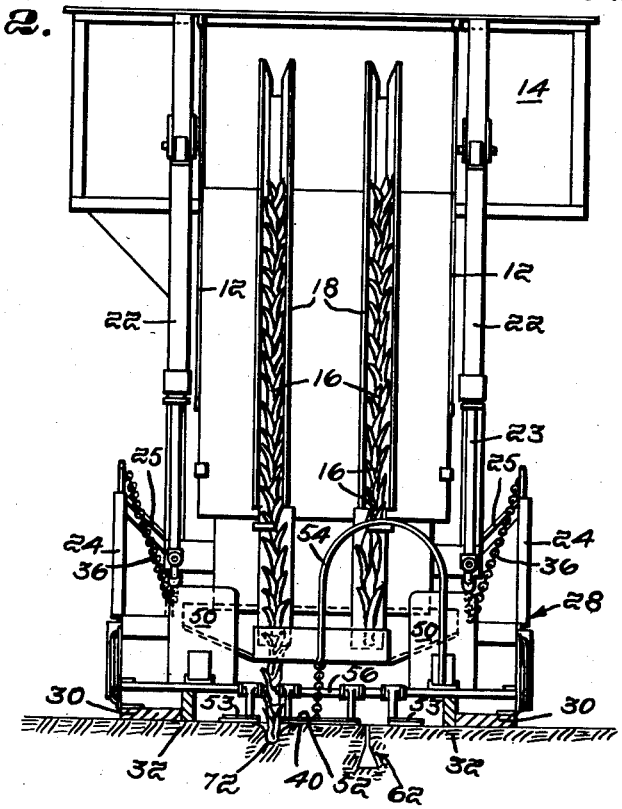
Fig. 2 is a rear end view of the equipment shown in Fig. 1, certain parts shown in the latter figure being omitted for clarity.

Referring first to Figs. 1 and 2, it will be observed that the tractor 10 is equipped with a box frame 12 supporting a bin 14, the latter being the source of supply of the pineapple slips 16, which are placed in the chutes 18 by a workman standing in the bin. Chutes 18 are pivotally supported at their lower ends and can be raised and lowered as will be described hereafter. Chords 19, one at either side of each chute 18, aid in support of the chutes when the latter are in operating position, as shown in Fig. 1.

Pivotally connected to the tractor is a "sulky" frame 17 comprising wheels 20 and shafts 21, one on either side of the tractor. Frame 17 carries a pair of obliquely extending posts 24, braced by members 25, and a pair of vertically adjustable plows 26. The purposes of these parts will subsequently appear.

The planting aid in the embodiment illustrated has the form of a sled 28 provided with runners 30 (see Fig. 2) of a width precluding substantial sinking of the sled into the soil 32, previously brought to condition by plowing, harrowing, etc. The sled is swivelly linked to the sulky frame 17 via a tongue 34 and is further linked to the sulky frame through chains 36 which are anchored at their upper ends to the posts 24. With this arrangement, the sled, when necessary, can be readily raised clear of the ground, as by a hydraulic system including the cylinders 22 and the piston rods 23, which are shown connected to the sulky frame 17. During this action, the chords 19 act as guides for the chutes as the latter are slid upwardly.

A pair of standards 38 fixed to the sled 28 at the front end thereof support two rolls of mulch paper 40, of which the upper is merely an auxiliary roll for use on exhaustion of the lower roll. The mulch paper, with its free end suitably anchored at the end of the planting bed rearwardly of the sled, pays out (as the equipment moves toward the right in Fig. 1) through a pair of die rollers 42 which operate to produce the slits 46, seen in Fig. 4, and thence under an idler 44 located at substantially ground level which serves to lay the mulch paper along the surface of the ground.

A transverse member 45 immediately ahead of the idler 44 acts to level off the soil before deposition of the mulch paper thereon (Fig. 5).

Fixed to the sled 28, behind supports 48 for the chutes 18, are a pair of seats 50 occupied in operation of the equipment by two workers charged with inserting the pineapple slips 16 through the slits 46 in the mulch paper into the soil. A drag plate 52 (see Fig. 2), with the side drags 53, serves to hold the mulch paper smooth on either side of each planting row. This plate and the side drags are fixed to a shaft 56 suitably journaled in bearings secured to the frame of the sled. Device 54 acts to support the drags when the sled is raised above ground level, as when the equipment is being turned around.

A pair of harrows 60 connected to the sled and towed therebehind throw soil over the side edges of the mulch paper which is thereby secured in place.

A most essential feature of my invention is represented by the members 62 fixed to the undersurface of the sled 28. These members are in line with the plows 26, which serve to break and loosen the soil thereahead and which may also be used as injection points for soil fumigants. Each consists of a blade element 64 and a plow element 66, the latter being triangular in cross section and progressively increasing in cross sectional area rearwardly of the blade element (see Figs. 4–6). As shown in Fig. 5, the bed former 45 terminates at a point directly above the point of juncture of the elements 64 and 66.

Figure 3:
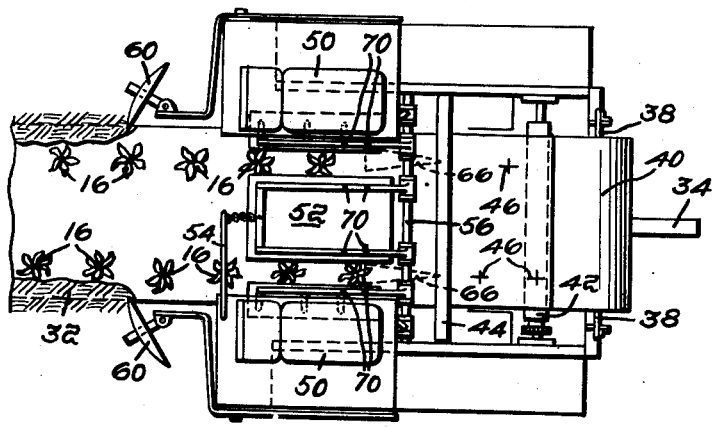
Fig. 3 is a plan of the planting aid.

With the equipment in motion as indicated by Fig. 1, and with the mulch paper being payed out at a rate determined by the speed of travel of the equipment, fugitive voids 72 are created in the soil behind the trailing ends of the plow elements 66 (Fig. 5). Gauge marks 70 associated with the sled 28 (see Fig. 3) are in line with such voids; consequently, when the operator inserts one of the pineapple slips through a slit in the mulch paper as the slit passes under the gauge, the slip enters the void, and upon subsequent filling of the void by the collapsing of the adjacent soil, becomes adequately anchored in the soil. As indicated by Fig. 5, the anchoring of one slip is complete by the time the next is inserted through the succeeding slit.

From the foregoing it should be clear that my invention enables unusually rapid mulching and planting of a field and that it represents a truly significant contribution to the art.

Various modifications in the equipment shown may be made, of course, without departing from the spirit and scope of the invention. Thus by way of example it may be noted that the drums carrying the mulch paper may be powered to the end of doing away with the necessity for anchoring the free end of the mulch paper at the end of the planting bed at the beginning of the planting operation. Also it is believed obvious that, depending on the extent of the preconditioning of the soil, it is possible to dispense with the plows associated with the sulky frame.

I claim:

1. A planting aid comprising in combination a body member adapted for movement across the surface of the soil, means secured to said body member for laying a mulch sheet along the surface of the soil as said body member advances, and a plow depending from said body member forward of said means and extending rearwardly beneath said means, said plow including a downwardly extending shank member which is transversely relatively thin and a generally horizontal expansion member extending in the direction of movement of said body member secured to the lower portion of said shank member as to be completely buried in the soil while said body member advances thereacross, said expansion member flaring outwardly from the front to rear and terminating abruptly in a generally vertical rear face, said plow member being adapted to form a subterranean void collapsible inwardly and downwardly beneath said mulch sheet immediately following passage of the plow.

2. A planting aid as defined in claim 1 wherein means secured to said body member are provided to pierce said mulch sheet at spaced intervals in alignment with said plow.

3. A planting aid comprising in combination a body member adapted to be moved across the surface of the soil, means supported by said body member for laying a mulch sheet along the surface of the soil as said body member is advanced, and a plow depending from said body member forward of said means and extending rearwardly beneath said means, said plow including a downwardly and rearwardly extending shank member which is transversely relatively thin and a generally horizontal expansion member secured to the lower rear portion of said shank member and extending rearwardly therefrom at a level sufficiently far below said body member as to be completely buried in the soil as said body member is advanced thereacross, said expansion member flaring laterally outwardly from front to rear and terminating abruptly in a generally vertical rear face, said plow member being adapted to form a subterranean void collapsible inwardly and downwardly beneath said mulch sheet immediately following passage of the plow.

References Cited in the file of this patent

UNITED STATES PATENTS

| 22,701 | Case | Jan. 25, 1859 |
| 107,162 | Chamberlin | Sept. 6, 1870 |
| 1,504,140 | Poll | Aug. 5, 1924 |
| 1,562,353 | McGuire et al. | Nov. 17, 1925 |
| 1,577,282 | McCartney | Mar. 16, 1926 |
| 1,972,281 | Walling | Sept. 4, 1934 |
| 2,626,578 | Morine | Jan. 27, 1953 |

FOREIGN PATENTS

| 16,120 | Great Britain | 1912 |